(12) United States Patent
Sobrito (10) Patent No.: US 7,093,334 B2
(45) Date of Patent: Aug. 22, 2006

(54) MACHINING UNIT WITH ORIENTABLE SPINDLE-AXIS FOR MILLING AND BORING OPERATIONS

(75) Inventor: Marco Sobrito, Turin (IT)

(73) Assignee: Comau SPA, Grugliasco (IT)

( * ) Notice: Subject to any disclaimer, the term of this patent is extended or adjusted under 35 U.S.C. 154(b) by 102 days.

(21) Appl. No.: 10/915,466

(22) Filed: Aug. 11, 2004

(65) Prior Publication Data

US 2005/0034290 A1   Feb. 17, 2005

(30) Foreign Application Priority Data

Aug. 11, 2003   (IT) .......................... TO2003A0632

(51) Int. Cl.
*B23P 23/00*   (2006.01)
(52) U.S. Cl. ....................... 29/26 A; 29/56.5; 29/27 C; 409/201; 409/235
(58) Field of Classification Search ................. 29/56.5, 29/26 A, 27 C, 27 R, 40; 409/201, 234, 409/231, 9, 66, 168, 235
See application file for complete search history.

(56) References Cited

U.S. PATENT DOCUMENTS

| 3,494,673 | A |   | 2/1970 | Wilcox |
| 4,316,684 | A |   | 2/1982 | Takeyama |
| 4,652,190 | A | * | 3/1987 | Corsi .......................... 409/201 |
| 4,850,765 | A | * | 7/1989 | Ramunas ..................... 409/234 |
| 5,052,089 | A | * | 10/1991 | Gadaud et al. ............. 29/27 R |
| 5,084,951 | A | * | 2/1992 | Bonomi et al. ............. 29/26 A |
| 5,346,343 | A | * | 9/1994 | Babel ......................... 409/201 |
| 5,410,790 | A | * | 5/1995 | Yang ............................. 29/40 |
| 5,899,645 | A | * | 5/1999 | Garschagen et al. ........... 409/9 |
| 5,964,016 | A | * | 10/1999 | Ito et al. ..................... 29/27 C |
| 6,155,756 | A | * | 12/2000 | Mericle et al. ............... 409/66 |
| 6,719,506 | B1 | * | 4/2004 | Chang et al. ................ 409/201 |
| 6,836,941 | B1 | * | 1/2005 | Prust et al. ................ 29/27 C |
| 2002/0085893 | A1 | * | 7/2002 | Geiger et al. .............. 409/168 |
| 2003/0063957 | A1 |   | 4/2003 | Hirabayashi |
| 2004/0141823 | A1 | * | 7/2004 | Padovani .................... 409/231 |

FOREIGN PATENT DOCUMENTS

| DE | 40 12 999 A1 | 10/1991 |
| DE | 43 16 411 C1 | 5/1994 |
| DE | 200 02 915 U1 | 9/2000 |
| EP | 1 050 364 A2 | 11/2000 |
| EP | 1 092 499 A2 | 4/2001 |
| EP | 1 273 386 A1 | 1/2003 |
| WO | 00/10768 A1 | 3/2000 |

\* cited by examiner

*Primary Examiner*—Monica Carter
*Assistant Examiner*—Dana Ross
(74) *Attorney, Agent, or Firm*—Sughrue Mion, PLLC

(57) ABSTRACT

A machining unit has a spindle-carrier structure, which can be oriented around a vertical axis.

6 Claims, 8 Drawing Sheets

MACHINING UNIT WITH ORIENTABLE SPINDLE-AXIS FOR MILLING AND BORING OPERATIONS

BACKGROUND OF THE INVENTION

The present invention relates to machining units for carrying out milling operations on planar surfaces or boring operations on prismatic elements, such as crankcases or cylinder heads of motor vehicle engines in general, such as automobiles, trucks, tractors and the like.

SUMMARY OF THE INVENTION

In the present description and in the following claims, the term "milling" is used with reference to rough machining and, semi-finishing or finishing operations. Instead, the term "boring" is to be intended as comprising real reaming, drilling, tapping, widening, boring, etc. operations.

The machining of elements of the above indicated type is normally carried out by lines formed by various machining units which successively execute the operations a predeterminated work cycle.

These machining units typically present a base fixed to the floor on which a first lower slide is mounted, movable in a horizontal "X" direction, and a second upper slide, movable on the first slide in a horizontal "Z" direction perpendicular to the "X" direction.

A spindle-carrier structure is mounted on the upper slide and presents a hollow cylindrical shape, in which the spindle together with the gearing system and the associated driving elettric motor is mounted.

The spindle axis is substantially parallel to the aforesaid "Z" horizontal sliding direction of the upper slide. On the spindle end a machining tool may be mounted, which has an orthogonal or slightly inclined front surface with respect to the spindle axis, and a peripheral surface with a circumferential edge defined between said front surface and said peripheral surface.

For boring operations, the spindle axis must be placed orthogonal to the plane to be worked. Instead, when a milling operation is to be performed, it is necessary that the milling cutter has its front surface slightly inclined with respect to the plane to be worked, so as to limit the contact between tool and surface to be worked only at a point of the aforesaid circumferential edge, in order to avoid the rapid wear which would occur if the milling cutter had its front surface parallel to the plane to be worked.

In the above mentioned machining lines, it is therefore necessary to arrange at least two different stations for carrying out milling and boring operations, respectively, which involves greater tooling costs and a greater bulkiness of the line itself.

In view of preventing this inconvenience, the present invention provides a single machining unit, comprising a spindle on which a milling tool or a reaming tool may be alternately mounted (by any automatic system of a known type for changing the tool), characterized in that said unit includes means for selectively positioning and locking the spindle at least in a first position or in a second position, in that in said first position, the spindle axis is placed according to a direction orthogonal to a surface of the workpiece, whereby the unit is adapted for a boring operation, upon assembling of a reaming tool on the spindle, and in that in said second position the spindle axis is slightly inclined with respect to said orthogonal direction, whereby the unit results arranged for a milling operation, upon assembling of a milling tool on the spindle.

In the preferred embodiment of the invention, the machining unit includes a base fixed to the floor, a first lower slide mounted on the base and movable in a horizontal "X" direction, a second upper slide mounted on the first slide in a horizontal "Z" direction perpendicular to the aforesaid "X" direction, a spindle-carrier structure which is carried by the second slide and defining a spindle-axis. The aforesaid spindle-carrier structure is carried by the second slide with the possibility of oscillation around a vertical axis, whereby the angle formed by the spindle axis with the aforesaid horizontal "Z" direction may be varied, as desired, between 0° and a maximum pre-established angle.

The second slide is provided with an electronic control system for automatically driving the oscillation of the spindle-carrier structure around said vertical axis between the two end positions, with the possibility of always automatically clamping the spindle-carrier structure in each of said positions.

The unit further includes, as already mentioned, a device of any known type for the automatic change of the tool.

For the above mentioned features, the machining unit according to the invention is usable both for performing boring operations and for milling operations, by automatically arranging the required tool and orienting the spindle axis either parallel or inclined with respect to the "Z" direction.

The above described system allows to automatically orient the spindle axis, and therefore the tool depending upon the type of the machining to be performed.

In the above preferred embodiment, the spindle locking means preferably consist of a series of hydraulic locking pistons which are interposed between the spindle-carrier structure and the structure of the second slide.

Still in the case of the preferred embodiment, both the first slide movement with respect to the base and that of the second slide with respect to the first one are obtained through a system of tracks having symmetry planes arranged according to an upverted V shape having an angle of 90°, with each plane inclined of 45° to the horizontal.

Although this arrangement is preferred for a best distribution of the stresses due to the shear forces, it is however not excluded the possibility of using co-planar tracks or tracks forming a different angle and/or tracks arranged on different planes.

Systems for adjusting the spindle-axis orientation include a screw-and-nut system or similar driven by an electric motor, which allows a continuous adjustment of the angular position of the spindle-carrier structure around the respective oscillation axis, but they can be also more simply defined by two opposite support surfaces for selective abutment of the spindle-carrier structure, which provide a reference of the positions with parallel spindle-axis and with inclined spindle-axis, respectively.

The angle of the support surface constituting the reference of the inclined axis position must be previously determined at design stage. It is however possible to arrange such inclined support surface on a quickly replaceable separate element, depending upon the desired inclination angle.

BRIEF DESCRIPTION OF THE DRAWINGS

Further features and advantages of the invention will result from the following description with reference to the enclosed drawings, which are given by way of not limitative example, wherein.

DETAILED DESCRIPTION OF THE INVENTION

With reference to the drawings, reference A generally designates a mechanical machining unit usable for carrying out both milling operations on planar surfaces and boring operations of cylindrical bores.

The unit A includes a lower base 2 which can, for example, consist of sheet metal elements electrically welded together or a cast iron body obtained by casting.

In a practical application, a line is provided which has one or more machining units of this type, constituting the stations by which the element is processed.

The element to be processed is moved along the line by way of a transfer system of any known type.

Figure 2:
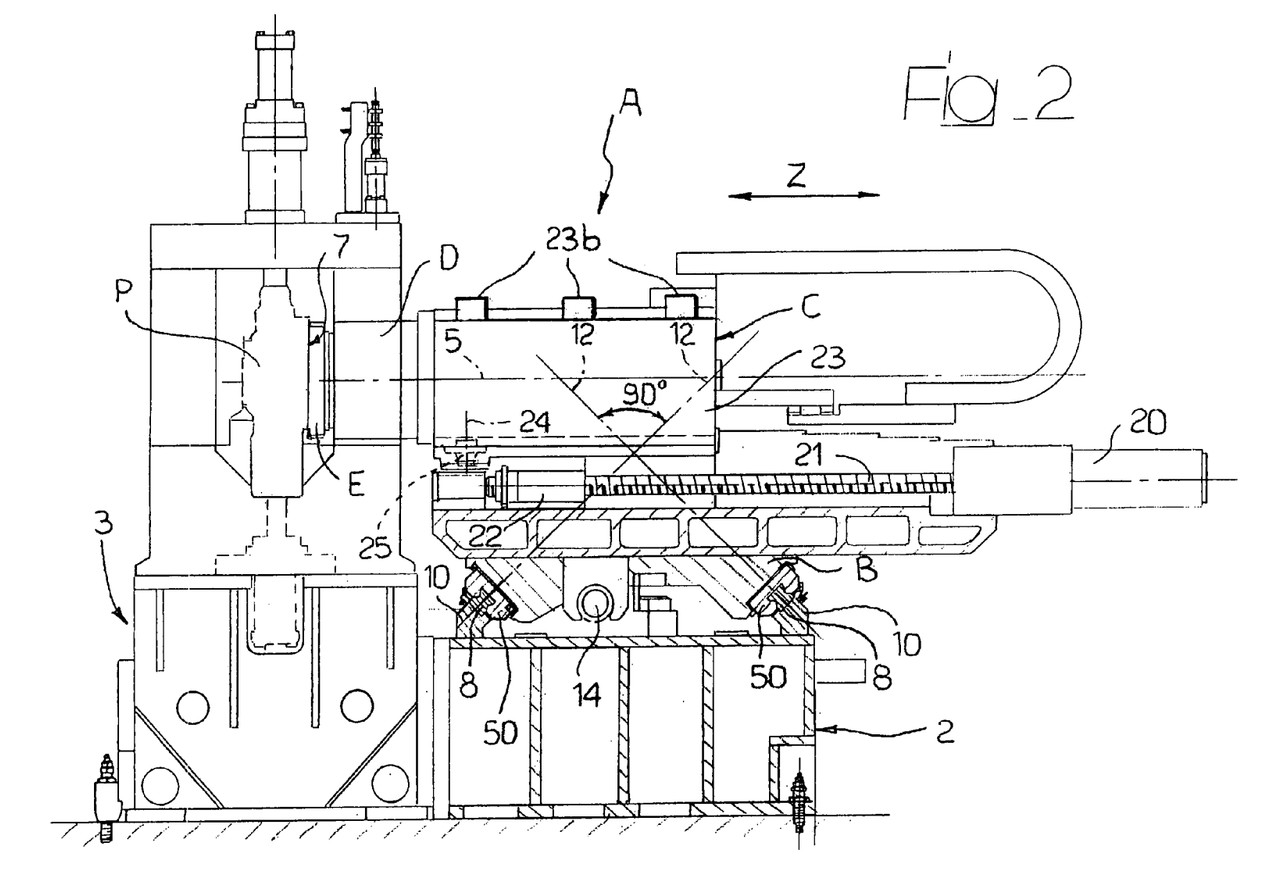
FIG. 2 is a sectional view according to the line II—II of FIG. 1.

FIG. 2 of the annexed drawings shows that the base 2 is suitably fixed to the floor and is placed adjacent to a fixed structure 3 of a system of any known type for moving the piece along the line (not shown in detail within the enclosed drawings).

The element being produced (for example the cylinder head or the crankcase of an internal combustion engine) is moved and blocked with any systems of the known type.

The machining unit A (FIGS. 1–5) comprises a spindle D, mounted in such a way that will result evident in the following, having a rotation axis 5 on which both a milling cutter-shaped tool E (see FIG. 4), designed for carrying out milling operations on the planar surfaces 7 of the piece P, upon inclination of the spindle-axis of an angle α (FIG. 4), and a reaming tool F (see FIG. 5), upon pre-arrangement of the spindle-axis in an orthogonal direction of the surface 7 may be mounted.

The base structure 2 presents a upper surface on which two tracks 8 (see FIGS. 1, 2) are mounted, on which run the yokes 50, carried by a first slide B or lower slide, which is thus directed in a horizontal "X" direction (see arrows in FIG. 1), orthogonal to a horizontal "Z" direction.

With reference to FIG. 2, two tracks 8 are mounted on two supports 10 fixed at the base 2. On the tracks 8, yokes 50 run, supported on the lower side by the lower slide B.

As can be seen in FIG. 2, the two tracks 8 have two respective symmetry planes 12, arranged according an "upside-down V" at 90°. Such an arrangement, even though it is preferred as allows an optimal balance of the stresses resulting from the moving mass and the machining stresses, is definitely not essential, so it is not excluded that the two tracks 8 can be arranged in a common horizontal plane or with a different angle or on two different planes.

The shifting of the slide B in the "X" direction is obtained by an asynchronous or "brushless" electric motor 13 (see FIGS. 1 and 3) which, through a joint, drives a ball recirculating screw 14.

The transmission could also be carried out by a belt with pulley or reducer, cylinder, hydraulic motor, etc.

Figure 1:
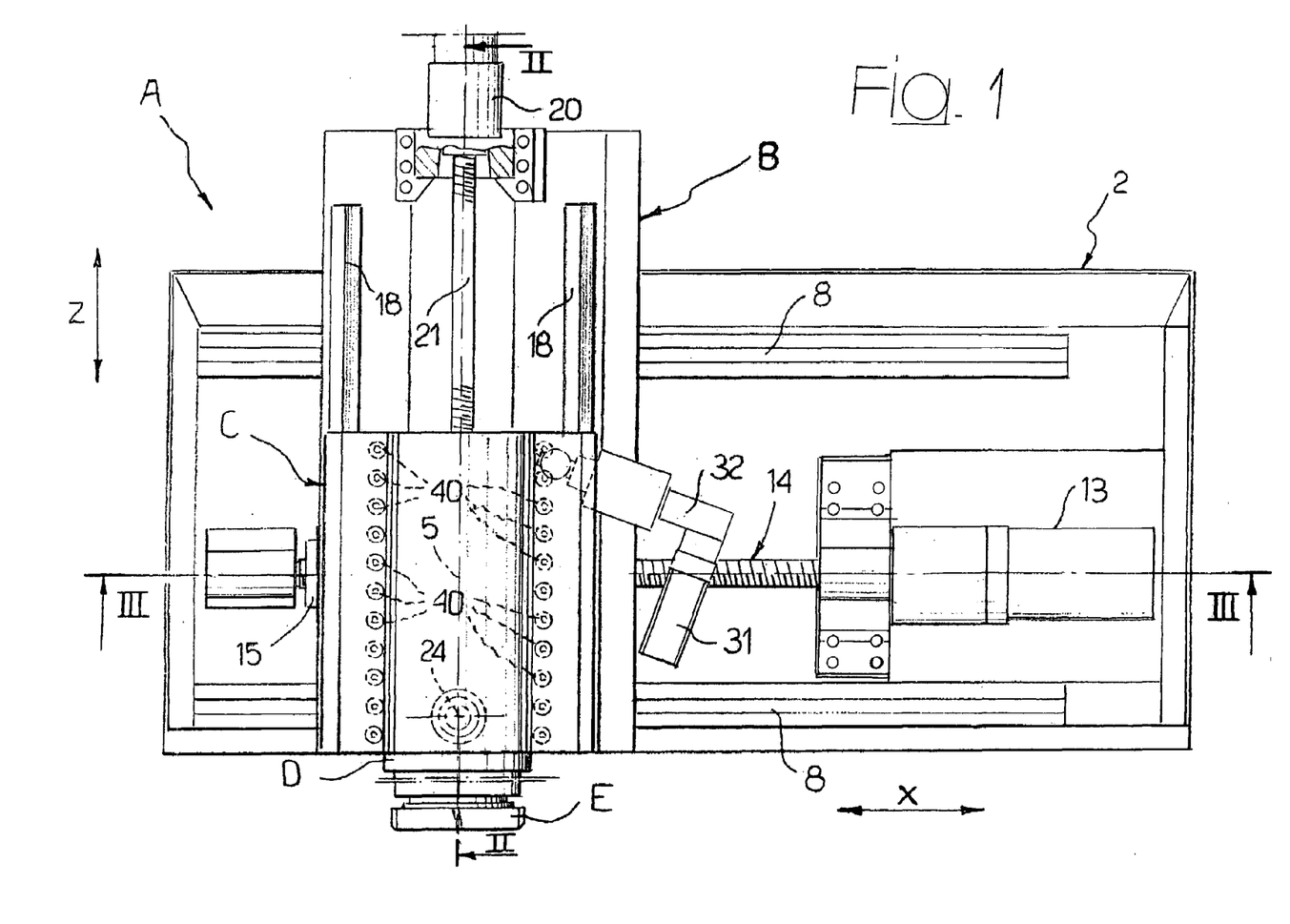
FIG. 1 is a plan view of a preferred embodiment of the machining unit according to the invention.
Figure 3:
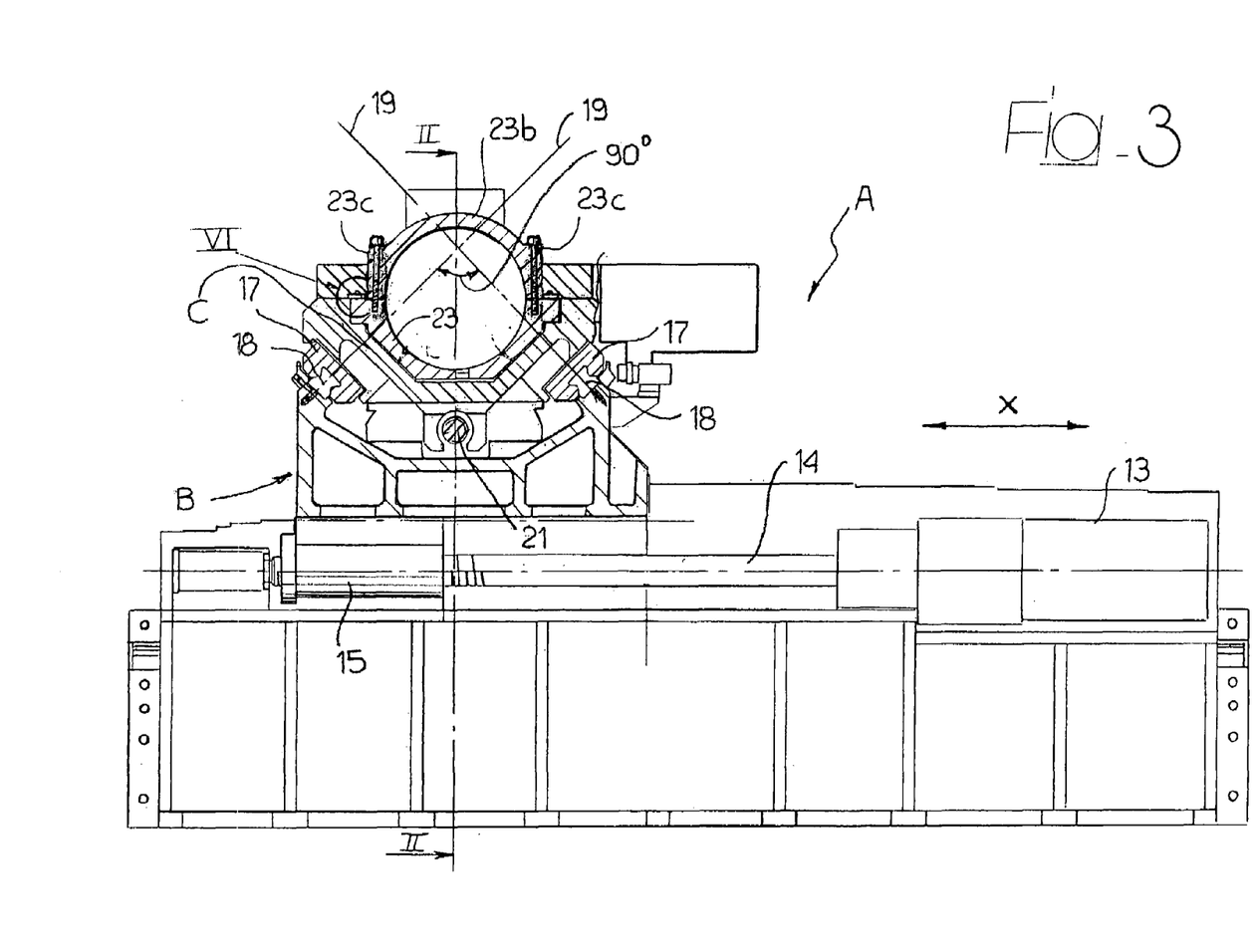
FIG. 3 is a sectional view according to the line III—III of FIG. 1.

The screw 14 engages, in a per se known way, a nut of the ball recirculating type 15 connected to the structure of the lower slide B.

The rotating movement of the screw 14 (driven by the motor 13) is then converted in rectilinear motion of the slide B in a "X" direction.

If desired, the slide B can be provided with a hydraulic system for the blocking thereof in any selected position, similar to the one that will be described below with reference to the second slide of the unit.

With particular reference to FIGS. 2, 3, a higher slide C is slidably supported by the lower slide B according to the horizontal "Z" direction, orthogonal to the "X" direction. For this purpose, the slide C is equipped with yokes 17 which are slide on tracks 18 fixed to the structure of the B slide.

Also in this case, with reference to the preferred embodiment, the two tracks 18 define two respective symmetry planes 19 arranged according to an "upside-down V" at 90°.

Again, also in this case it could be foreseen that the two tracks 18 are arranged in a single horizontal plane, either with different angle and/or on two different planes.

The movement of the slide C in the "Z" direction is obtained through an asynchronous or "brushless" electric motor 20 (see FIGS. 1, 2) which through a joint, drives a screw 21.

The transmission can also be carried out through a belt with pulleys or reducer, cylinder, hydraulic motor, etc.

The screw 21 engages, in a per se known way, a nut of the ball recirculating type 22 and it is connected to the slide C.

The rotating movement of the screw 21 (driven by the motor 20) is then converted in rectilinear motion of the slide C in a "Z" direction.

The slide C is provided with a hydraulic system for the blocking thereof in any selected position, similar to the one that will be described below.

On the slide C a spindle-carrier structure 23 can oscillate around a vertical axis 24, with a cylindrical cavity in which the "electrospindle", comprised of the spindle D (axis 5) and the respective driving electric motor (not shown in the drawings), is mounted.

Figure 4:
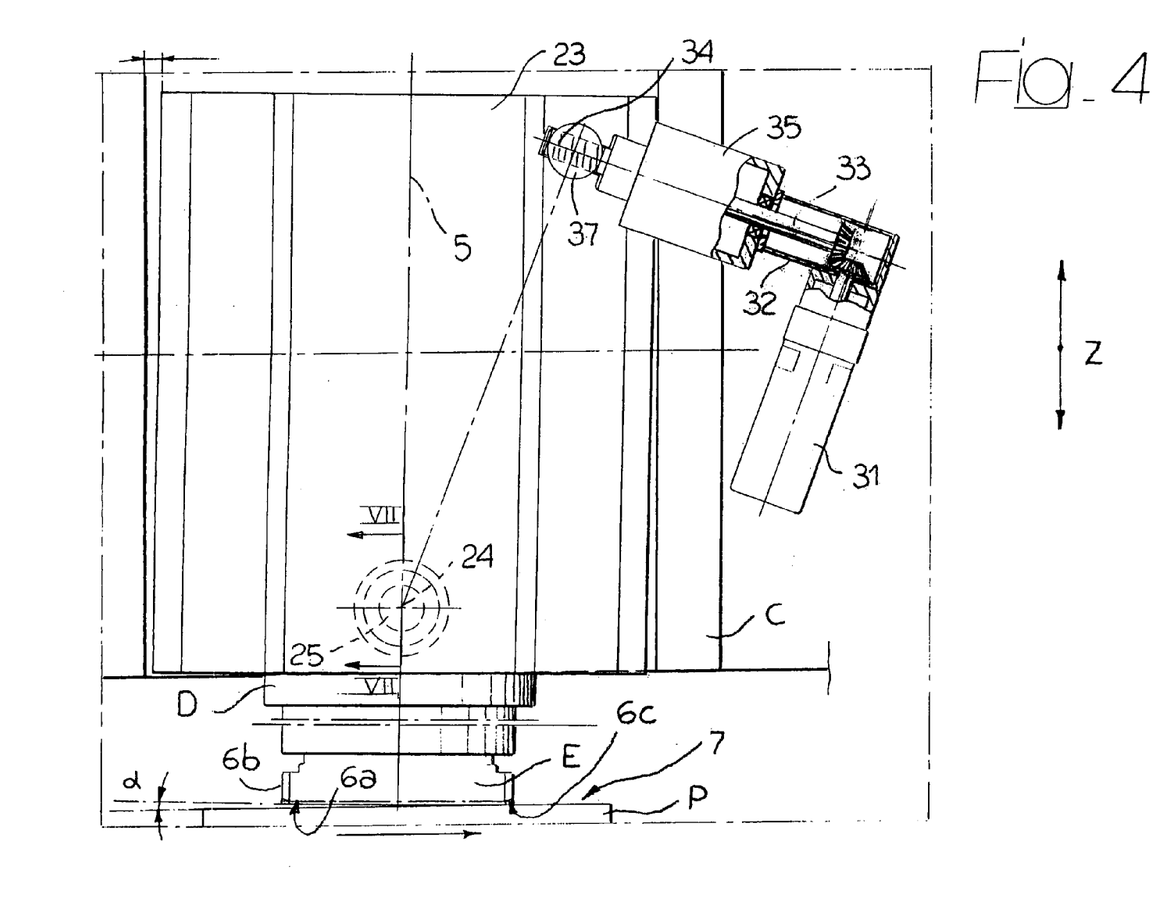
FIG. 4 is an enlarged-scale view of a detail of FIG. 1, showing the configuration of the machine for carrying out milling operations.
Figure 5:
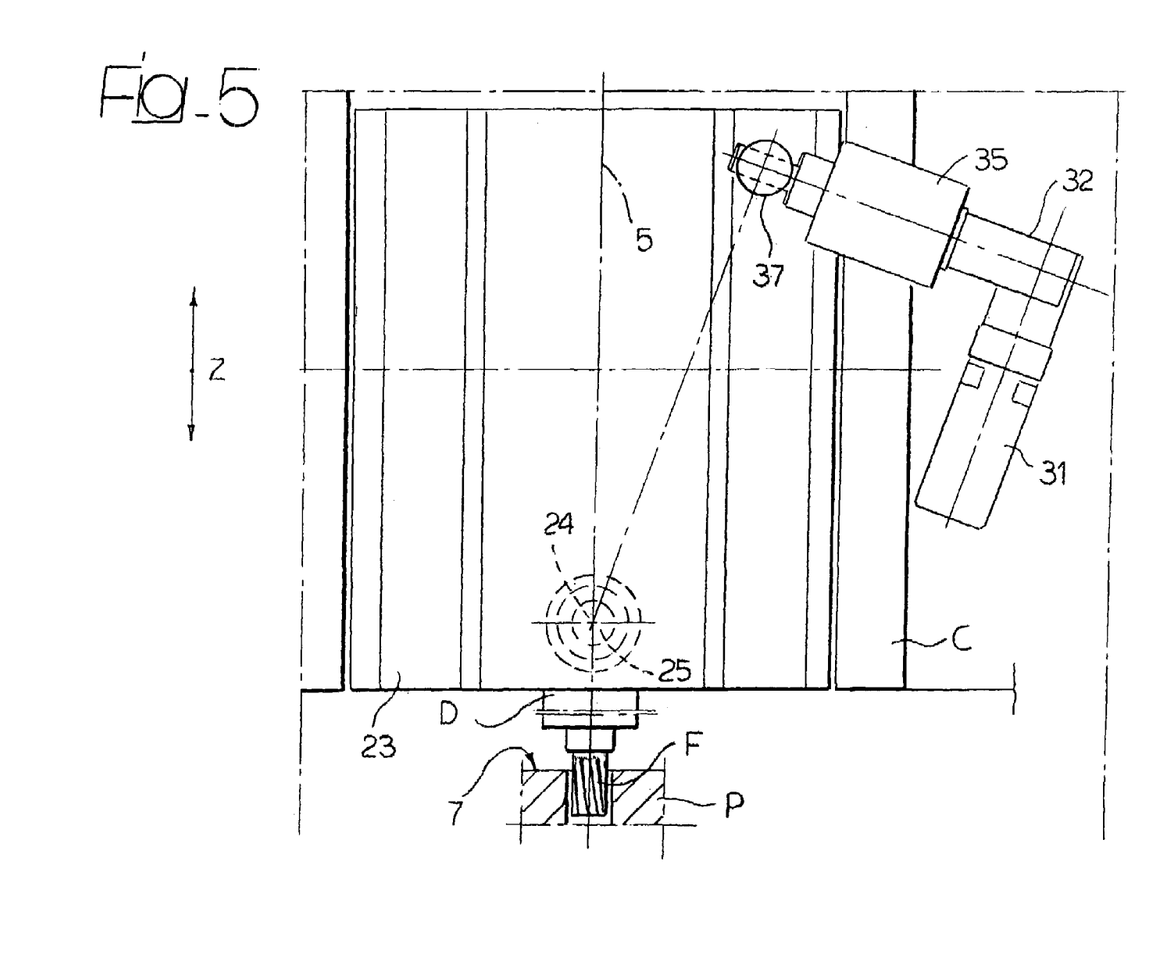
FIG. 5 shows the same view of FIG. 4 in the configuration for carrying out boring operations.

As it can be clearly seen in FIG. 4, the axis 5 of the spindle may be inclined with respect to the longitudinal Z movement direction of the slide C with a small angle α (for example according a 1:1.000 ratio).

This is arranged for placing the milling cutter E (FIG. 4) with its frontal surface 6a forming the same angle with respect to the planar surface 7 to be worked. The milling cutter E has a peripheral surface 6b defining, together with the frontal surface 6a of the cutter machine 6, a circumferential edge 6c. When the milling cutter is placed in the inclined position, shown in FIG. 4, the contact between the milling cutter and the planar surface to be worked is only executed in a substantially punctiform zone of the circumferential edge 6c. This is arranged when a milling operation of the surface 7 on the "P" element is required, for decreasing the milling cutter wear and improving the quality of the worked surface.

The possibility of inclining the axis of the spindle 5 of the above mentioned angle α exists, as the spindle-carrier structure 23 is mounted on the higher slide C possibly oscillating around a vertical axis 24 (see FIG. 4) through a pin 25.

Figure 7:
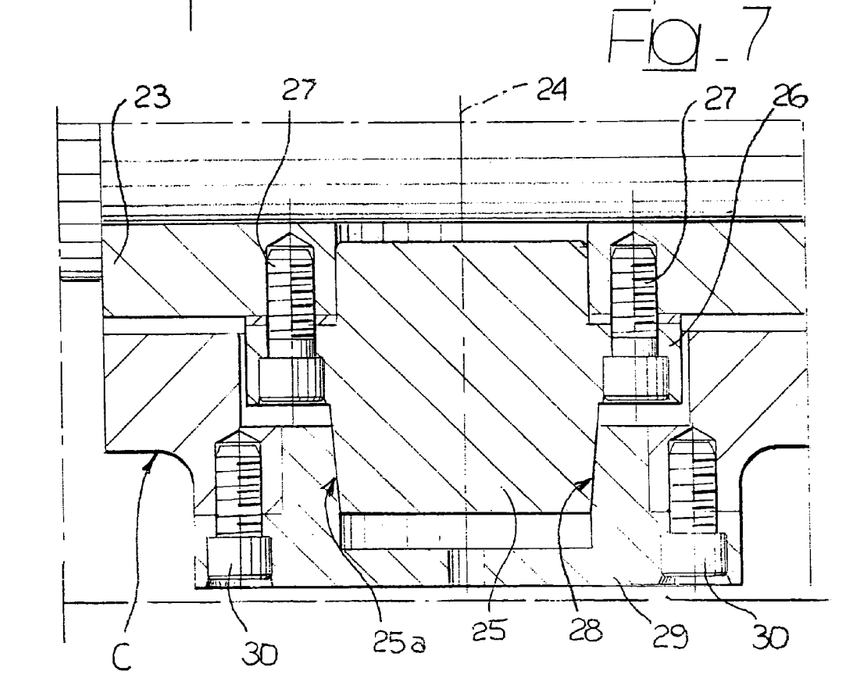
FIG. 7 is a sectional view according to the line VII—VII of FIG. 4, in an enlarged scale.

FIG. 7 shows in an enlarged scale the detail of the pin 25. As it can-be clearly seen in this figure, the pin 25 has an annular flange 26 fixed through screws 27 at the spindle-carrier structure 23 and has one end 25a with a conical conformation which can be received within a conical cavity 28 as well, with a corresponding conformation obtained in a flange 29 fixed through screws 30 at the structure of the slide C. Due to such an assembly, the whole spindle-carrier structure 23 can then rotate in a horizontal plane relative to the slide C, by oscillating around the axis 24.

Of course, the oscillating movement allowed for the spindle-carrier structure 23 around the axis 24 is reduced, as the obtainment of a relatively reduced inclination of the axis 5 of the spindle with respect to the Z direction is enough, for example corresponding to one millimeter cross movement in the "Z" direction, on a 1.000 millimeter length in the "X" direction.

Figure 6:
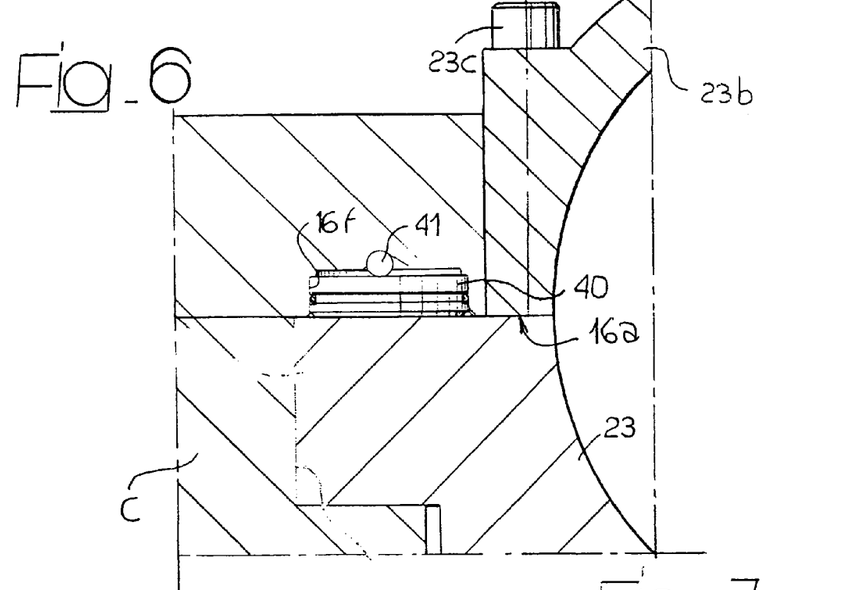
FIG. 6 is an enlarged-scale view of the detail shown by the arrow VI in FIG. 3.

As it can be still seen in FIG. 6, in the particular example shown, the spindle-carrier support 23 forms a lower half-shell on which one or more half-shell 23b are fixed through screws 23c, so as to block the electro-spindle between the lower half-shell 23 and the higher semi-rings 23b. The semi-rings 23b are fixed by screws 23c on two planes 16a of the lower half-shell 23.

With reference to FIG. 4, the oscillation movement of the spindle-carrier structure 23 around the axis 24 is carried out by an electric motor 31 and a transmission box 32. The electric motor 31 drives the rotation of the shaft 33 and a screw 34, supported in rotation by the box 35.

The screw 34 engages a leadscrew 37 comprised of a cylindrical body rotatably mounted around its axis within the spindle-carrier structure 23.

The rotation of the electric motor 31 of a determined angle determines the oscillation of the whole spindle-carrier structure 23 around the axis 24.

The spindle-carrier structure 23, placed in the required angular position with respect to the "P" element to be worked is then blocked on the structure of the slide C through a pistons system 40 diagrammatically shown in FIG. 1.

In FIG. 6, a detail of a piston is shown in an enlarged scale. The pistons, sliding within the chamber 16f obtained in the structure of the slide C, are pushed by the oil coming from a duct 41 against the surface of the spindle-carrier structure 23, so as to block it by friction.

In the milling operation, the electric motor 20 is driven in order to positioning the milling cutter E in the "Z" direction on the surface of the element to be worked, while the motor 13 is driven for imparting the tool the required movement for carrying out machining of the surface 7, which is fixed (see FIG. 4).

The boring operation (see FIG. 5) is carried out by maintaining the axis 5 of the spindle parallel to the longitudinal "Z" direction and by positioning on the spindle D a reaming tool F.

On the contrary, as already indicated, when a milling operation is to be performed, the axis 5 is inclined as shown in FIG. 4 by driving the electric motor 31. Of course, position sensors of the spindle-carrier structure 23 are preferably arranged with respect to the oscillation axis 24, which allow to carry out an automated control, according to a closed loop logic, of the structure position.

Figure 8:
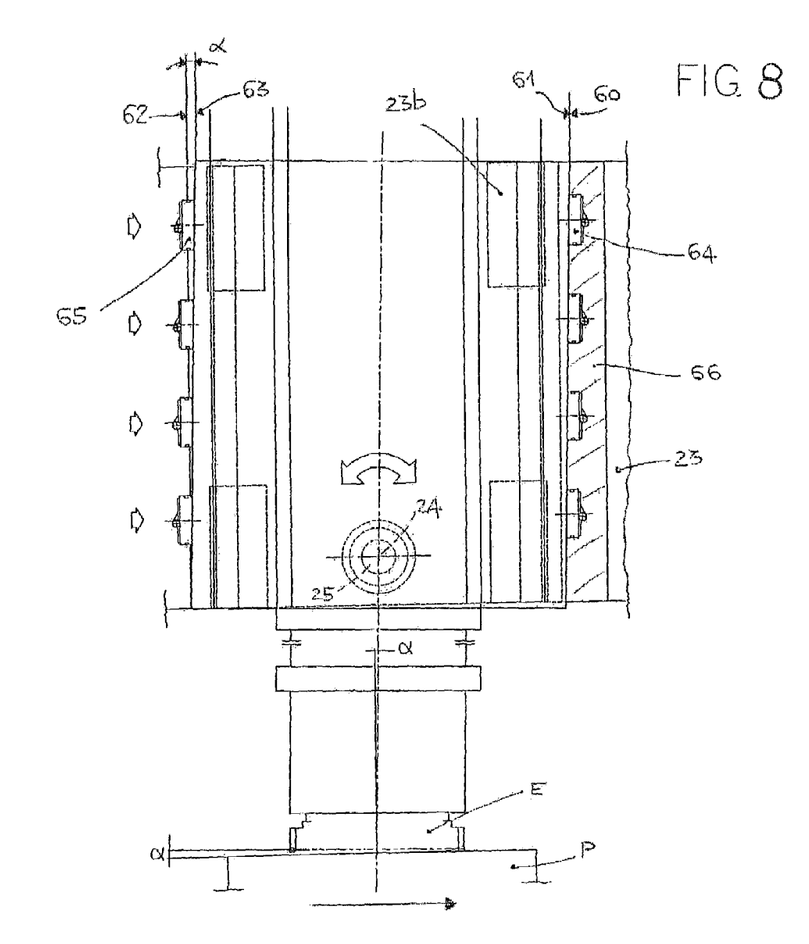
FIGS. 8 and 9 show a variation.
Figure 9:
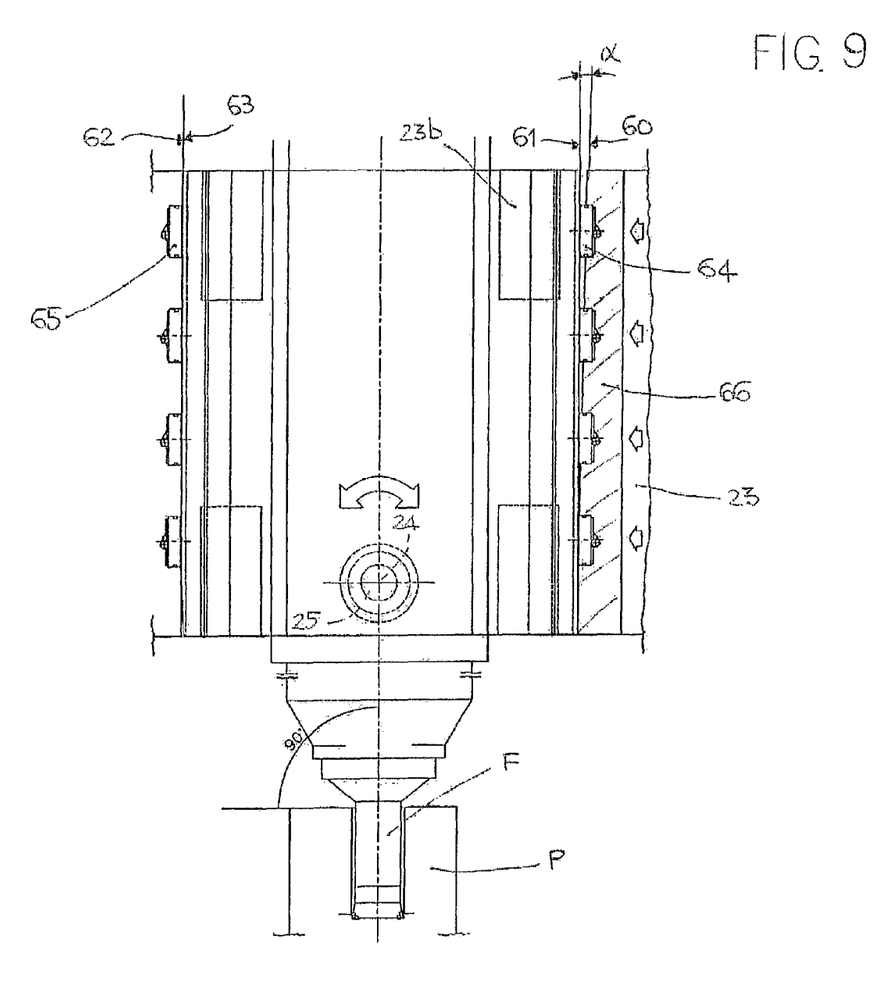

As already indicated, the above described example allows to position the spindle-carrier structure relative to its oscillation axis 24 in any position between the position wherein the axis of the spindle D is parallel to the "Z" direction and an outermost position wherein the axis of the spindle D forms with the "Z" direction a maximum pre-established angle. This allows to fit the unit to different requirements of milling machining, which can need different values of the angle α. It is however possible to arrange a rotation system of the structure 23 relative to the simplified oscillation axis 24, which provides to position the structure only in the location with aligned spindle-axis and in a position corresponding to an assigned and fixed angle α. It can be provided, for example (see FIGS. 8 and 9), a pair of opposite support surfaces 60–61 and 62–63, forming together the assigned angle α and constituting a reference of the two possible operational positions of the structure 23, after which the structure movement between said position can be obtained for example by fluid-pistons 64 and 65 of the type 40 in figure 6, mounted on the structure of the slide C and laterally acting against the surfaces 61 and 63 of the semi-ring 23b, for pushing the structure 23 from two sides in either directions, against either surfaces 60 and 62 of reference. The reference surface, angular relative to the "Z" direction, can be obtained in a single and replaceable element 66, mounted on the structure of the slide C, so as to allow a variation of the reference position if the angle α has to be changed.

For milling machining (FIG. 8), the spindle-carrier structure 23 is urged from the pistons 65 against the reaction plane 60, in this condition the surfaces 60 and 61 are in contact and the pistons 64 are not pressurized.

For boring machining (FIG. 9), the spindle-carrier structure 23 is urged from the pistons 64 against the reaction plane 62, in this condition the surfaces 62 and 63 are in contact and the pistons 65 are not pressurized.

Obviously, without prejudice to the principle of the invention, dimensions, construction details and embodiments could widely vary with respect to what has been described and shown by mere way of example, however without leaving the ambit of the present invention.

What is claimed is:

1. A machining unit, comprising:
   a fixed base,
   a first lower side, slidably mounted on the base along a first horizontal direction,
   a first motor means carried by said base for controlling the position of said first lower slide along said first horizontal direction,
   a second upper slide, slidably mounted on said first lower slide along a second horizontal direction perpendicular to said first horizontal direction,
   second motor means carried by said first slide, for controlling the position of said second upper slide along said first horizontal direction
   a spindle-carrier structure mounted on said second slide and defining a spindle axis substantially parallel to said second horizontal direction,
   a tool carrying spindle, rotatably mounted within said spindel-carrier structure, and driven by a motor carried by said spindel-carrier structure, said spindle having a front end which is selectively coupable to a milling tool or a reaming tool, means for supporting a workpiece at a fixed position relative to said base, with the workpiece having a planar surface located in front of said end of said spindle and substantially perpendicular to said second horizontal direction, said planar surface being to be subjected to a milling operation with the aid of said milling tool and/or to a boring operation with the aid of said reaming tool, wherein said spindel-carrier structure is freely pivotally mounted relative to said upper slide around a vertical axis intersecting said spindle axis, by means of a vertical hinge pin, said spindel-carrier structure being received within a cradlelike support surface of said upper slide which is arranged so as to allow a slight rotation of said spindel-carrier structure around said hinge pin, while always supporting the spindel-carrier structure, and means for controlling the position of said spindel-carrier structure around said hinge pin, comprising actuator means connected to a portion of said spindel-carrier structure spaced away from said hinge pin, so that activation of said actuator means causes a slight rotation of said spindel-carrier structure around said hinge pin, and means for locking the rotation of said spindel-carrier structure relative to said upper slide around said vertical hinge pin either in a first position, in which the axis of the spindle is orthogonal to said planar surface of the workpiece, for a boring operation, or a second position, in which the axis of the spindle is slightly inclined with respect to said orthogonal direction, for a milling operation.

2. Machining unit according to claim 1, wherein the locking means of the spindel-carrier structure in the selected position consist of a series of hydraulic power locking pistons which are interposed between the spindel-carrier structure and the structure of the second slide.

3. Machining unit according to claim 1, wherein said first slide is slidably mounted on said base by two tracks lying on respective planes inclined to the horizontal, according to a V-shape arrangement.

4. Machining unit according to claim 1, wherein said second slide is slidably mounted on said first slide by two tracks lying on respective planes inclined to the horizontal, according to a V-shape arrangement.

5. Machining unit according to claim 1, wherein said means for controlling the position of said spindel-carrier structure around said vertical hinge pin include a screw-and-nut thread system driven by an electric motor.

6. Machining unit according to claim 1, wherein the spindle with the respective driving electric motor constitutes an assembly which is fixed in a replaceable way between a lower halfshell, forming the spindel-carrier structure, and one or more upper semi-rings screwed upon the spindel-carrier structure.

* * * * *